(12) United States Patent
Salter et al.

(10) Patent No.: US 10,800,213 B2
(45) Date of Patent: Oct. 13, 2020

(54) TIRE WEAR DETECTION APPARATUS AND RELATED METHODS

(71) Applicant: Ford Global Technologies, LLC, Dearborn, MI (US)

(72) Inventors: Stuart C. Salter, White Lake, MI (US); Paul Kenneth Dellock, Northville, MI (US); David Brian Glickman, Southfield, MI (US); James J. Surman, Clinton Township, MI (US); Terry Lobsinger, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 243 days.

(21) Appl. No.: 15/673,178

(22) Filed: Aug. 9, 2017

(65) Prior Publication Data

US 2019/0047330 A1 Feb. 14, 2019

(51) Int. Cl.
*B60C 11/24* (2006.01)
*B60Q 1/00* (2006.01)

(52) U.S. Cl.
CPC .......... *B60C 11/246* (2013.01); *B60C 11/243* (2013.01); *B60Q 1/00* (2013.01)

(58) Field of Classification Search
None
See application file for complete search history.

(56) References Cited

U.S. PATENT DOCUMENTS

| | | | | | |
|---|---|---|---|---|---|
| 1,557,232 | A | * | 10/1925 | Allen | B60Q 1/22 362/243 |
| 1,740,588 | A | * | 12/1929 | Hamilton | B60R 13/10 362/516 |
| 3,607,498 | A | * | 9/1971 | Kubota | B05D 5/061 152/523 |
| 3,770,040 | A | * | 11/1973 | De Cicco | B60C 11/24 116/208 |
| 3,947,677 | A | * | 3/1976 | Steinle | B60Q 1/326 362/506 |
| 4,802,069 | A | * | 1/1989 | Chandler | B60Q 1/2692 362/286 |
| 5,303,756 | A | * | 4/1994 | Hill | B60C 11/24 152/154.2 |

(Continued)

FOREIGN PATENT DOCUMENTS

CN 101465090 6/2009
DE 102005050642 4/2007

(Continued)

OTHER PUBLICATIONS

Munoz, "Tire Tread Wear Indicators," Tire Collection by ikkatu, Jan. 4, 2017, 9 pages.

(Continued)

*Primary Examiner* — Jill E Culler
(74) *Attorney, Agent, or Firm* — Raymond L. Coppiellie; Hanley, Flight & Zimmerman, LLC (57) ABSTRACT

Tire wear detection apparatus and related methods are disclosed. An example vehicle includes a tire including a wear bar coupled thereto. The example vehicle also includes a light source to emit a light and means for directing the light to the tire. At least a portion of the wear bar is to glow when exposed to the light.

9 Claims, 8 Drawing Sheets

(56) References Cited

U.S. PATENT DOCUMENTS

| | | | |
|---|---|---|---|
| 5,558,426 A * | 9/1996 | Cabanatan | B60Q 1/2657 362/249.01 |
| 6,279,633 B1 | 8/2001 | Corvasce | |
| 6,286,573 B1 * | 9/2001 | Hine | B60C 11/00 152/209.18 |
| 6,422,725 B1 * | 7/2002 | Fong | B60Q 1/24 362/287 |
| 6,431,236 B1 | 8/2002 | Kanenari et al. | |
| 6,709,138 B1 | 3/2004 | Johnson | |
| 6,807,995 B1 | 10/2004 | Majumdar et al. | |
| 6,817,743 B2 * | 11/2004 | Sharper | B60Q 1/326 362/183 |
| 6,945,679 B2 | 9/2005 | Young | |
| 7,502,124 B2 | 3/2009 | Muhlhoff et al. | |
| 7,557,694 B1 * | 7/2009 | Graham | B60C 11/24 340/438 |
| 8,383,214 B2 | 2/2013 | Schaepkens et al. | |
| 9,290,123 B2 | 3/2016 | Salter et al. | |
| 9,315,145 B2 | 4/2016 | Salter et al. | |
| 9,340,152 B2 | 5/2016 | Salter et al. | |
| 9,393,903 B2 | 7/2016 | Salter et al. | |
| 9,393,904 B2 | 7/2016 | Salter et al. | |
| 9,409,515 B2 | 8/2016 | Salter et al. | |
| 9,434,294 B2 | 9/2016 | Salter et al. | |
| 9,434,304 B2 | 9/2016 | Salter et al. | |
| 9,440,579 B2 | 9/2016 | Salter et al. | |
| 9,457,712 B2 | 10/2016 | Salter et al. | |
| 9,459,453 B2 | 10/2016 | Salter et al. | |
| 9,463,736 B2 | 10/2016 | Salter et al. | |
| 9,463,737 B2 | 10/2016 | Salter et al. | |
| 9,463,738 B2 | 10/2016 | Salter et al. | |
| 9,463,739 B2 | 10/2016 | Salter et al. | |
| 9,464,776 B2 | 10/2016 | Salter et al. | |
| 9,464,886 B2 | 10/2016 | Salter et al. | |
| 9,481,297 B2 | 11/2016 | Salter et al. | |
| 9,487,127 B2 | 11/2016 | Salter et al. | |
| 9,487,128 B2 | 11/2016 | Salter et al. | |
| 9,487,135 B2 | 11/2016 | Salter et al. | |
| 9,487,136 B2 | 11/2016 | Salter et al. | |
| 9,499,090 B2 | 11/2016 | Salter et al. | |
| 9,499,094 B1 | 11/2016 | Dellock et al. | |
| 9,500,333 B1 | 11/2016 | Johnson et al. | |
| 9,527,438 B2 | 12/2016 | Salter et al. | |
| 9,533,613 B2 | 1/2017 | Salter et al. | |
| 9,538,874 B2 | 1/2017 | Salter et al. | |
| 9,539,939 B2 | 1/2017 | Salter et al. | |
| 9,539,941 B2 | 1/2017 | Salter et al. | |
| 9,573,520 B1 | 2/2017 | Salter et al. | |
| 9,586,518 B2 | 3/2017 | Salter et al. | |
| 9,586,519 B1 | 3/2017 | Salter et al. | |
| 9,586,527 B1 | 3/2017 | Salter et al. | |
| 9,587,800 B2 | 3/2017 | Salter et al. | |
| 9,587,967 B1 | 3/2017 | Salter et al. | |
| 9,593,820 B1 | 3/2017 | Salter et al. | |
| 9,604,567 B1 | 3/2017 | Dellock et al. | |
| 9,604,569 B1 | 3/2017 | Salter et al. | |
| 9,613,549 B2 | 4/2017 | Salter et al. | |
| 9,623,797 B1 | 4/2017 | Salter et al. | |
| 9,649,877 B2 | 5/2017 | Salter et al. | |
| 9,664,354 B1 | 5/2017 | Dellock et al. | |
| 9,682,649 B2 | 6/2017 | Salter et al. | |
| 9,682,651 B2 | 6/2017 | Salter et al. | |
| 9,688,186 B2 | 6/2017 | Dellock et al. | |
| 9,688,189 B1 | 6/2017 | Salter et al. | |
| 9,688,190 B1 | 6/2017 | Johnson et al. | |
| 9,688,192 B2 | 6/2017 | Salter et al. | |
| 9,694,743 B2 | 7/2017 | Salter et al. | |
| 2003/0140999 A1 | 7/2003 | Smith et al. | |
| 2005/0217782 A1 | 10/2005 | Agostini | |
| 2009/0129107 A1 | 5/2009 | Egerer et al. | |
| 2011/0126617 A1 | 6/2011 | Bengoechea Apezteguia et al. | |
| 2012/0001406 A1 | 1/2012 | Paxton et al. | |
| 2013/0316181 A1 | 11/2013 | Kouno et al. | |
| 2015/0138789 A1 | 5/2015 | Singer et al. | |
| 2015/0138808 A1 | 5/2015 | Salter et al. | |
| 2015/0138817 A1 | 5/2015 | Salter et al. | |
| 2015/0138820 A1 | 5/2015 | Salter et al. | |
| 2015/0217683 A1 | 8/2015 | Salter et al. | |
| 2015/0246637 A1 | 9/2015 | Salter et al. | |
| 2015/0267881 A1 | 9/2015 | Salter et al. | |
| 2015/0283940 A1 | 10/2015 | Salter et al. | |
| 2015/0353003 A1 | 12/2015 | Salter et al. | |
| 2015/0367772 A1 | 12/2015 | Salter et al. | |
| 2016/0031367 A1 | 2/2016 | Salter et al. | |
| 2017/0072846 A1 | 3/2017 | Salter et al. | |
| 2017/0166107 A1 | 6/2017 | Salter et al. | |
| 2017/0174124 A1 | 6/2017 | Salter et al. | |
| 2017/0197543 A1 | 7/2017 | Abdelnour et al. | |
| 2017/0274712 A1 * | 9/2017 | Salter | F21K 9/64 |

FOREIGN PATENT DOCUMENTS

| | | |
|---|---|---|
| EP | 2163406 | 3/2010 |
| GB | 2265586 | 10/1993 |
| JP | S8118406 | 7/1983 |
| KR | 19970035083 | 2/1999 |

OTHER PUBLICATIONS

"How to Measure Tyre Wear," Rezulteo, retrieved from <https://tyres.rezulteo.co.uk/tyre-tips/maintaining-your-tyre/how-to-measure-tyre-wear-2283>.

* cited by examiner

TIRE WEAR DETECTION APPARATUS AND RELATED METHODS

FIELD OF THE DISCLOSURE

This disclosure relates generally to vehicles and, more particularly, to tire wear detection apparatus and related methods.

BACKGROUND

Vehicle tires include tread to engage a surface (e.g., a road) and provide traction to a vehicle during operation of the vehicle. Over time, the tire tread may become worn. Excessive wear and/or degradation of the tire tread (e.g., a bald tire) can adversely affect vehicle traction and, thus, a driver's ability to control the vehicle under certain driving conditions (e.g., a wet road surface).

SUMMARY

An example vehicle disclosed herein includes a tire including a wear bar coupled thereto. The example vehicle also includes a light source to emit a light and means for directing the light to the tire. At least a portion of the wear bar is to glow when exposed to the light.

Another example vehicle disclosed herein includes a tire and a lamp disposed proximate to the tire. The lamp includes a light source to emit a non-visible light. At least a portion of the tire is to be exposed to the non-visible light. The at least the portion of the tire is to emit a visible light when exposed to the non-visible light.

An example apparatus disclosed herein includes a lamp coupled to a vehicle. The lamp includes a light source to emit a light. The example apparatus also includes a duct disposed proximate to the light source. The duct is to direct the light onto a tread of a tire of the vehicle. At least a portion of the tread is to glow when exposed to the light.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Tires of a vehicle (e.g., a car, a truck, a motorcycle, etc.) include tread that provide traction to the vehicle relative to a surface on which the vehicle travels (e.g., a paved road, a gravel road). Over time, the tire tread becomes worn due to repeated contact between the tread and the surface(s) on which the vehicle travels. Worn tire tread can compromise the ability of a driver of the vehicle to control the vehicle under certain travel conditions, such as roads that are wet due to rain or snow. For example, water on a road surface can cause the vehicle to lose traction and control (e.g., cause the vehicle to hydroplane) if the tread is worn and/or degraded.

Tire wear indicators aid the driver in determining whether a tire of the vehicle needs to be maintained or replaced due to worn tire tread. In some known examples, tire wear indicators (e.g., bars or protrusions) are disposed in grooves (e.g., rain grooves) of the tire tread. When the tread wears and/or degrades, a thickness of the tread reduces to a height that aligns or substantially aligns with the tire wear indicators disposed in the grooves, which causes the tire wear indicators to be exposed. In such known tire wear indicators, the exposure of the bars or protrusions disposed in the grooves informs the driver and/or vehicle owner that the tire should be maintained or replaced. However, detecting the exposure of such known tire wear indicators often requires manual inspection of the tire by the driver and/or vehicle owner. For example, the driver and/or vehicle owner may have to bend or kneel to closely inspect the tire to view the tire wear indicators. Further, known tire wear indicators can be difficult to visually inspect due to their small size, their location within the grooves of the tread, and/or the position of the tire wear indicators relative to a wheel well in which the tire is disposed. Some known tire wear indicators may require the driver and/or owner to be in a well-lit location in order to view the tire wear indicators.

Other known tire wear indicators include luminescent material(s) that glow (e.g., emit a visible light) when exposed to light. However, such known tire wear indicators rely on exposure of the luminescent material(s) to light from sources external to the vehicle such as, for example, a street lamp located near the vehicle when the vehicle is parked. As a result, the luminescent material(s) of such known tire wear indicators may not properly charge if the indicators are not exposed to light from the external light source for a sufficient period of time or the luminescent material(s) may cease glowing before the driver and/or vehicle owner sees the indicators. Therefore, known tire wear indicators often fail to inform the driver (and/or the owner) of the vehicle that one or more tires of the vehicle need to be maintained or replaced. Therefore, the driver may fail to properly maintain or replace the tire(s) by relying on known tire wear indicators, which can significantly reduce traction and/or performance of the vehicle (e.g., during certain weather and/or road surface conditions) and can leave the vehicle occupant(s) at risk during use of the vehicle.

Examples disclosed herein provide for tire tread wear detection via tire wear indicators that are coupled to (e.g., integrated with) a tread of a tire and become visible to a driver and/or vehicle owner via exposure of the tire wear indicators to light source(s) of the vehicle as the tire tread wears. In some disclosed examples, at least a portion of the tire tread includes material(s) that glow (e.g., emit a visible light) when charged as a result of exposure to light. In some disclosed examples, the vehicle includes one or more light sources that direct light onto the material(s) to charge the material(s) during operation of the vehicle. As a result, the portion of the tire tread including the tire wear indicator(s) glows when the tread of the tire wears and/or degrades (e.g., excessively wears and/or degrades) and the example tire wear indicator(s) are exposed. As such, a person (e.g., a driver and/or an owner of the vehicle, a vehicle occupant, a pedestrian, etc.) observing the vehicle can readily identify the glowing portion of the tire and, as a result, determine that tire needs to be replaced or maintained. Examples disclosed herein do not rely on external light sources (e.g., street lamps, sunlight, light emitted by other vehicles, etc.) to charge the tire wear indicator material(s) but instead utilize, for example, existing electrical circuits in the vehicle to generate the light that charges the tire wear indicator materials(s). Thus, disclosed examples efficiently and conveniently aid a driver and/or an owner of the vehicle in properly maintaining the vehicle tire(s).

Examples disclosed herein provide a tire of a vehicle having one or more wear bars coupled to a tread of the tire. In some examples, the wear bar(s) are disposed in the tread of the tire beneath an outer surface of the tire, or a surface of the tire that engages, for example, a road. In some examples, the wear bar(s) are at least partially disposed in grooves (i.e., rain grooves) of the tread. As the tread wears, the example wear bar(s) are exposed.

The wear bar(s) of the disclosed examples include one or more luminescent materials that cause at least a portion of the wear bar(s) to glow when the material(s) are exposed to light and/or for a period of time after the material(s) are exposed to light. In some disclosed examples, the wear bar(s) include phosphor material(s) (e.g., long persistence phosphor(s)) to absorb energy provided by the light and release the energy by generating and emitting a visible light, which enables the wear bar(s) and, thus, the portion of the tire including the exposed wear bar(s) to glow. The phosphor material(s) can be disposed in paint, tape, etc. that is disposed in (e.g., coupled to, integrally formed with) the wear bar(s).

In some examples, the phosphor material stores the energy provided by the light (i.e., the phosphor material charges) to enable the wear bar(s) and/or the portion thereof to glow after being exposed to the light for a period of time (e.g., a particular length of the time based on one or more properties of the phosphor material). In some examples, the phosphor material of the wear bar(s) can glow for an extended period of time (e.g., up to 48 hours) after being exposed to the light. As a result, any person observing and/or inspecting the vehicle during the (extended) time interval that the wear bar(s) are glowing can readily identify the glowing wear bar(s) of the tire. Thus, examples disclosed herein reduce instances in which a person (e.g., the driver, the vehicle owner) fails to determine that the tire tread needs attention because of tire wear indicators that are difficult to see, only glow for short periods of time, etc.

Example tire wear indicators disposed herein can include one or more other materials aside from phosphor material(s) that cause the wear bar(s) to glow when exposed to a light and/or after being exposed to the light. For example, the tire wear indicators can include one or more fluorescent materials and/or other luminescent materials.

In some examples, the wear bar(s) have a cross-sectional shape that increases as the tread wears and/or degrades. For example, the wear bar(s) may have a tapered cross-sectional shape such that an area of the wear bar(s) exposed to the light increases as the tire wears. Thus, in some examples, the wear bar(s) glow brighter as the tread wears and/or degrades due to the increased amount of luminescent material(s) that are exposed to light as the tire tread wears.

Examples disclosed herein provide a light source to charge the luminescent material in the example tire wear bar(s) to detect tire tread wear. In disclosed examples, the light source is coupled to the vehicle that includes the tire(s) having the tire wear indicator(s). The light source can be any one or more of a light-emitting diode (LED) (e.g., an ultraviolet (UV) LED), a light bulb (e.g., a UV light bulb), etc. to generate a light (e.g., a concentrated light) and emit the light onto the tread of the tire including the tire wear bar(s). In some examples, the light source is disposed proximate to the tire such that the light is emitted directly onto at least a portion of the wear bar(s). For example, the light source can be disposed within or proximate to a wheel well, a wheel vent, a running board and/or rocker molding of the vehicle.

In some examples, the light source provides a visible light, such as a blue light (e.g., a length having a wavelength of approximately 475 nanometers. In other examples, the light source provides a non-visible light, or a light that is not visible to a human eye (e.g., light having a wavelength of less than approximately 400 nanometers). For example, the light source can emit a UV light having a wavelength between 360 nanometers and 390 nanometers. In some examples, the UV light facilitates charging of the tire wear bar(s) including, for example, phosphor material, which results in extended glow periods for the phosphor material (e.g., 20 minutes of charging time results in approximately 24 hours of glow time). Thus, disclosed example light sources efficiently charge the luminescent material(s) of the tire wear bar(s) during operation of the vehicle. Further, the use of non-visible light results in discrete charging of the tire wear bar(s) without drawing attention to the tires by shining visible light (e.g., light having a wavelength between approximately 400 and 700 nanometers) on the tread during charging.

In some examples, the light source is coupled to a lamp of the vehicle such as, for example, a headlamp, a taillamp, a fog lamp, a side marker lamp, or another vehicle lamp. In such examples, the light source may be operatively coupled to a circuit board and/or a power or signal transmission wire of the vehicle lamp to receive power provided by the vehicle, which can reduce costs associated with installing the light source and/or powering the light source.

Some examples disclosed herein provide means for directing the light to the tire, which enables at least a portion of the tire and/or the wear bar(s) to be effectively exposed to the light provided by the light source. For example, the means for directing the light can include a duct interposed between the light source and the tire. In some examples, a first end of the duct is coupled to and/or disposed proximate to the light source to receive the light provided therefrom and a second end of the duct is disposed proximate to the tire to channel the light to the tire via a path provided by the duct.

Figure 1:
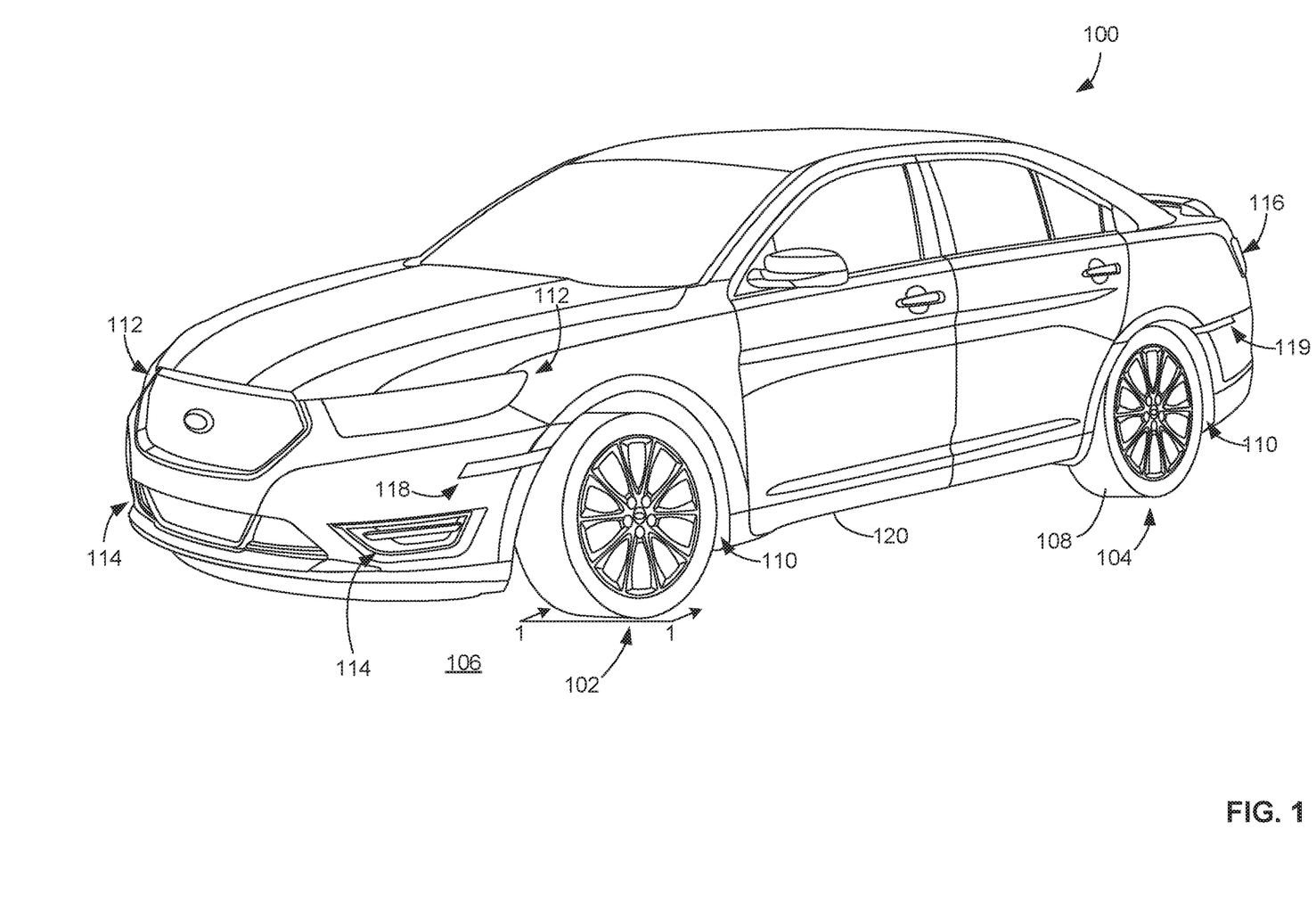
FIG. 1 illustrates a right, front perspective view of a first example vehicle including tires and one or more lamps for implementing examples disclosed herein.

FIG. 1 illustrates a right, front perspective view of a first example vehicle 100 in which examples disclosed herein can be implemented. The first vehicle 100 can be a car, a van, a truck, etc. having one or more tires to provide traction to the first vehicle 100. For example, the right side of the first vehicle 100 shown in FIG. 1 includes a first tire 102, or a front tire, and a second tire 104, or a rear tire. The left side of the first example vehicle 100 mirrors the right side of the first vehicle 100 shown in FIG. 1 (e.g., the left side includes corresponding front and rear tires 102, 104) and, for brevity, will not be discussed herein. Each of the tires 102, 104 of the illustrated example includes tread 108 that engages a surface (e.g., asphalt, concrete, dirt, sand, rocks, etc.) 106 on which the vehicle 100 travels. The tires 102, 104 are disposed in respective wheel wells 110 of the vehicle 100. The first vehicle 100 can have additional or fewer tires 102, 104 than illustrated in FIG. 1.

According to the illustrated example, the first vehicle 100 includes one or more lamps to illuminate the surface 106 and/or inform drivers of other vehicles and/or pedestrians of the presence of the first vehicle 100 and/or intended actions by the driver of the first vehicle 100 (e.g., turning, braking). In the illustrated example, the first vehicle 100 includes vehicle lamps such as headlamp(s) 112, fog lamp(s) 114, taillamp(s) 116, a first side marker lamp 118 disposed proximate to the first or front tire 102, and a second side marker lamp 119 disposed proximate to the second or rear tire 104. The vehicle lamps of the first vehicle 100 generate visible light (e.g., light having a wavelength between approximately 400 and 700 nanometers) and emit the light away from the first vehicle 100 via a lamp light (e.g., a light bulb, an LED, etc.) 502 (shown in FIG. 5) and a lens (e.g., a white lens, a red-colored lens, a yellow-colored lens provide for different colored light). For example, the headlamp(s) 112 and/or fog lamps 114 disposed proximate to the first or front tire 102 can emit white light to illuminate the surface 106 for the driver of the first vehicle 100. The taillamp(s) 116 and/or the second side marker lamp 119 disposed proximate to the rear tire 104 can emit red or crimson colored light to indicate that the first vehicle 100 is braking. The first side marker lamp 118 disposed proximate to the first tire 102 of the first vehicle 100 can emit yellow, orange and/or amber colored light to indicate a turn signal and/or hazard signal. The first vehicle 100 can include additional or fewer vehicle lamps than illustrated in FIG. 1. For example, the first vehicle 100 can have a lamp disposed in a rocker panel or molding 120 (i.e., a rocker panel lamp) of the first vehicle 100.

Figure 2:
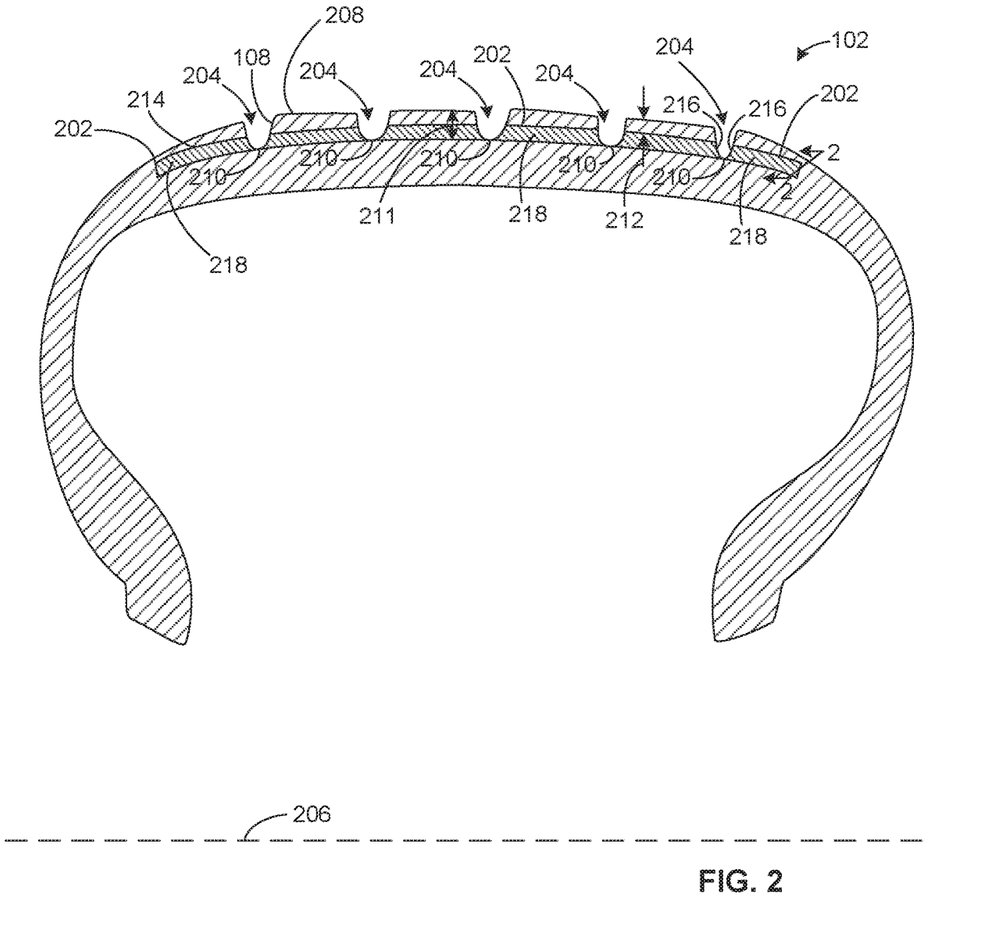
FIG. 2 is a partial cross-sectional view of tread of an example tire of the vehicle of FIG. 1 taken along the 1-1 line of FIG. 1, the tread including example wear bars in accordance with the examples disclosed herein.

FIG. 2 is a partial cross-sectional view of the tread 108 of the first example tire 102 (e.g., the front tire) of the first vehicle 100 of FIG. 1 taken along the 1-1 line of FIG. 1. In FIG. 2, the tread 108 includes wear bars 202 in accordance with the examples disclosed herein. According to the illustrated example, the wear bars 202 are imbedded and/or disposed within the tread 108 of the first tire 102 such that the wear bars 202 are coupled to the first tire 102. In some examples, the wear bars 202 are formed from a single wear bar disposed in the tread 108 that is divided into two or more wear bars as a result of the formation of recesses or grooves 204 formed in the tread 108. The first tire 102 can include multiple wear bars 202 coupled to the tread 108 and distributed radially relative to a rotational axis 206 of the first tire 102. Although FIG. 2 illustrates the tread 108 and wear bars 202 of the first tire 102, the other tires of the first example vehicle 100 of FIG. 1 (e.g., the second example tire or rear tire 104) can include substantially similar tread 108 having one or more wear bars 202 coupled thereto.

As mentioned above, the first tire 102 includes the annular recesses or grooves 204 (e.g., rain grooves) defined in the tread 108. The grooves 204 are formed between a first or outer surface 208 of the tread 108 (e.g., a ground engaging surface) and a second or inner surface 210 of the tread. In the example of FIG. 2, a depth of the respective grooves 204 defines a thickness (e.g., 0.5 inches, 0.75 inches, 1 inch, etc.) 211 of the portion(s) of the tread 108 including the wear bars 202.

In the illustrated example, the wear bar(s) 202 are disposed beneath the outer surface 208 of the first tire 102 at a certain depth (e.g., 0.1 inches, 0.25 inches, 0.5 inches, etc.) 212 that can indicate a condition and/or a health status of the first tire 102. In some examples, an exposure surface 214 of the respective wear bars 202, or a surface that is exposed when the tread 108 is worn or begins to wear, is disposed at a depth relative to the outer surface 208 that is selected based on, for example, predefined tire safety criteria. For example, the first tire 102 may need to be maintained or replaced when the tread 108 wears and/or deteriorates such that the exposure surface 214 of the wear bar 202 is exposed.

In some examples, one or more portions 216 of the wear bar(s) 202 are exposed before the surface 214 of the wear bar(s) 202 is exposed. The portion(s) 216 can correspond to edges of the wear bars 202 that may be exposed due to the formation of the grooves 204 in the tread 108. In some examples, one or more of the wear bar(s) 202 extends across one or more of the grooves 204. Put another way, in such examples, a portion of a wear bar 202 is disposed in a groove 204 (e.g., at a depth below the outer surface 208 of the tread 108).

The example wear bars 202 of FIG. 2 include means for glowing disposed therein. In the example of FIG. 2, the means for glowing includes a material (e.g., a luminescent material) 218 that enables at least a portion of the respective wear bars 202 to glow when the material 218 is exposed to a light (e.g., a visible light and/or a non-visible light) and/or for a period of time after the material is exposed to the light. The means for glowing can illuminate a colored light, such as blue, red, etc. As a result, a person (e.g., a driver, an owner and/or an occupant of the first vehicle 100, occupant(s) of another vehicle, a pedestrian, etc.) viewing and/or observing the first vehicle 100 can identify the portion of the first tire 102 including the glowing wear bar 202 and, thus, can determine that the first tire 102 may need to be replaced or otherwise maintained.

In some examples, the means for glowing is integrally formed in a material of the wear bar(s) 202. In other examples, the means for glowing is applied to a portion of the wear bar(s) 202 (e.g., the exposure surface 214 of the wear bar 202) in the form of a paint or other coating. In other examples, the means for glowing includes tape coupled to a portion of the wear bar(s) 202. The means for glowing can be disposed in the wear bar(s) 202 in other ways than disclosed herein to enable the means for glowing to be exposed to light when the wear bar(s) 202 are exposed.

In some examples, the means for glowing includes a phosphor material (e.g., a long persistence phosphor such as doped di-silicates, $Eu^{2+}$-activated alkaline earth aluminate, other alkaline earth aluminates and silicates, etc.) that absorbs energy provided by the light and releases the energy by emitting a visible light in response to being exposed to the light, which enables the wear bar 202 and, more generally, at least a portion of tread 108 of the first tire 102 to glow. In particular, the phosphor material stores the energy of the light (i.e., the phosphor material charges) and enables the wear bar 202 to glow for a period of time after being exposed to the light. For example, the phosphor material can cause the wear bar 202 to glow for a time interval (e.g., 1 hour, 12 hours, 24 hours, 48 hours, etc.) after being exposed to the light based on a length of time of exposure of the phosphor material to light and/or one or more properties of the phosphor material (e.g., a thickness of the phosphor material disposed in the wear bar(s) 202). Thus, the person viewing and/or observing the first vehicle 100 can identify the glowing wear bar(s) 202 of the first tire 102 during the time interval over which the phosphor material glows.

Additionally or alternatively, the means for glowing can include one or more other materials that cause the wear bar(s) 202 to glow while exposed to the light and/or for a period of time after being exposed to the light. For example, the means for glowing can include one or more fluorescent materials (e.g., organic or inorganic fluorescent dyes such as rylenes, xanthenes, porphyrins, phthalocyanines, etc.), other phosphor materials (e.g., short persistence phosphors Ce-doped garnet phosphors), and/or other luminescent materials (e.g., materials that may become excited upon exposure to light and having phosphorescent or fluorescent properties).

Figure 3:
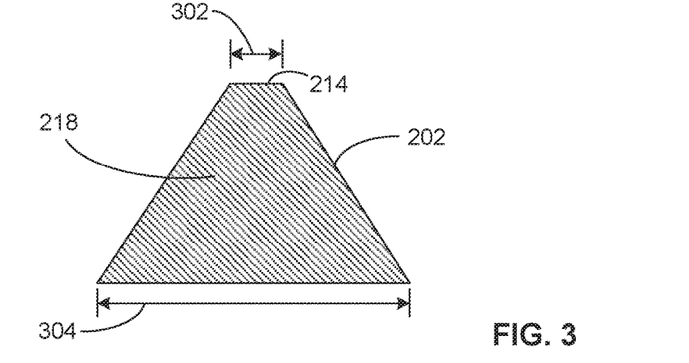
FIG. 3 is a cross-sectional view of one of the example wear bars of FIG. 2 taken along the 2-2 line of FIG. 2.

FIG. 3 is a cross-sectional view of one of the wear bars 202 of FIG. 2 taken along the 2-2 line of FIG. 2. FIG. 3 illustrates an example cross-sectional shape of the wear bar 202. In the illustrated example, the cross-sectional shape of the wear bar 202 is tapered such that a width 302 of an uppermost (in the orientation of FIG. 3) portion of the wear bar 202 is smaller than a width 304 of the lowermost (in the orientation of FIG. 3) portion of the wear bar 202. As such, an exposed area of the surface 214 of the wear bar 202 gradually increases as the tread 108 of the first tire 102 wears and/or degrades, which enables an increased amount of the material 218 of the wear bar 202 to be exposed to light. Thus, in some examples, the material 218 glows brighter as the tread 108 wears and/or degrades based on an amount of the wear bar 202 that is exposed. Thus, the cross-sectional shape of the example wear bar 202 of FIG. 3 provides for increased indication of the degradation of the tire tread 108 by enabling the wear bar 202 to glow brighter as the tread 108 wears and/or degrades over time.

The example wear bar 202 can have different cross-sectional shapes than illustrated in FIG. 3. For example, the wear bar 202 can have a triangular or a semi-circular cross-sectional shape. As mentioned above, in some examples, the cross-sectional shape of the wear bar 202 provides for indications of increased wear of the tread 108 based on the amount of the wear bar 202 that is exposed over time.

Figure 4:
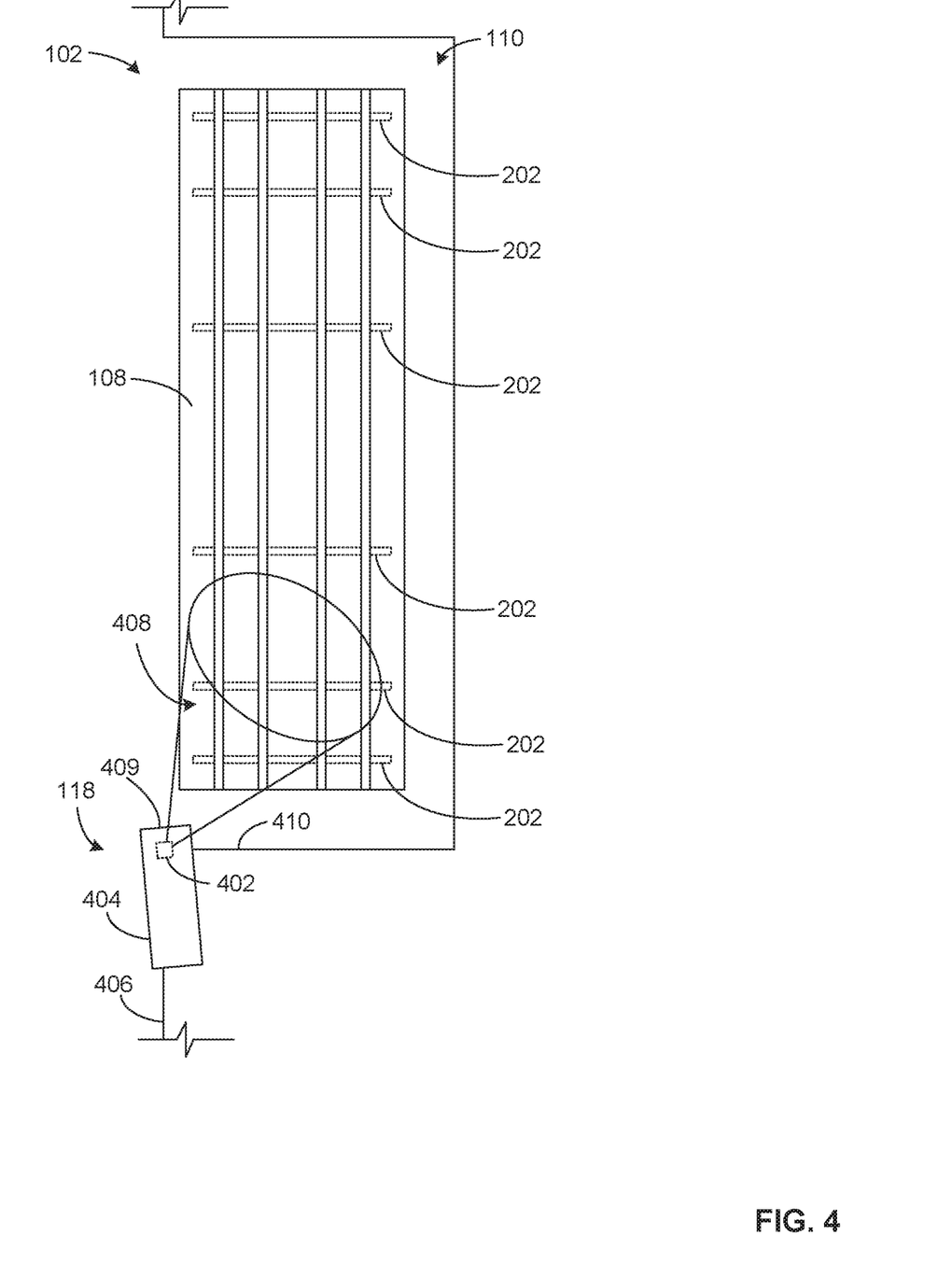
FIG. 4 is a top view of a wheel well of the example vehicle of FIG. 1 including a first example light source for detecting tire tread wear in accordance with the examples disclosed herein.

FIG. 4 is a top view of the wheel well 110 of the first vehicle 100 of FIG. 1 including the first example tire 102 (e.g., the front tire) and an example first light source 402 for detecting tire tread wear in accordance with the examples disclosed herein. The first light source 402 of the illustrated example can be one of an LED (e.g., a UV LED), a light bulb (e.g., a UV light bulb), etc. In the illustrated example, the first light source 402 is operatively coupled to the first side marker lamp 118 of the first vehicle 100 disposed proximate to the first or front tire 102. The first side marker lamp 118 of the illustrated example has a lens 404 at least partially exposed to an exterior 406 of the first vehicle 100. Although the example of FIG. 4 is discussed in connection with the first side marker lamp 118, the example of FIG. 4 could be implemented in connection with other vehicle lamps, such as a lamp coupled to a running board of a vehicle (e.g., as disclosed in connection with FIG. 7, below).

The first tire 102 of the illustrated example includes a plurality of wear bars 202 radially distributed about the first tire 102 (e.g., coupled to the tread 108 of the first tire 102). The example first light source 402 of FIG. 4 generates a light (e.g., a non-visible light and/or a visible light) 408 and emits the light 408 (e.g., in the form of a concentrated beam of light). In the example of FIG. 4, at least a portion of the light 408 is emitted onto at least a portion of the tread 108 including one or more portions of the wear bar(s) 202 during rotation of the first tire 102 (e.g., as the first vehicle 100 travels) or while the first tire 102 is stationary. Thus, in examples when the wear bar(s) 202 and/or portions thereof are exposed due to wear, the means for glowing in the wear bar(s) 202 charges via the light 408. For example, the first light source 402 and/or a portion of the lens 404 of the side marker lamp 118 (e.g., a portion 409 of the lens 404 facing an interior of the wheel well 110) may be orientated relative to the wheel well 110 such that at least a portion of the light 408 is directed onto a portion of the tread 108 of the first tire 102. As the first tire 102 rotates, at least a portion of one or more of the wear bar(s) 202 is exposed to (e.g., rotate past) the light 408 generated by the first light source 402 (i.e., when the portion(s) of the wear bar(s) 202 are exposed due to tread wear).

In some examples, the light 408 emitted by the first light source 402 includes visible light, such as blue light (e.g., light having a wavelength of approximately 475 nanometers). In other examples, the light 408 emitted by the first light source 402 is a non-visible light (e.g., a light having a wavelength less than approximately 400 nanometers, such as a UV light). Thus, in some examples, a person viewing the first vehicle 100 does not see the light emitted by the first light source 402 to charge the material 218 of the tire wear bar(s) 202. In some examples, the light 408 is a UV light having a wavelength between 360 nanometers and 390 nanometers. In examples where the tire wear bar(s) include a phosphor material, UV light can facilitate charging of the phosphor material in less time as compared to non-UV light.

In some examples, the first light source 402 is operatively coupled to the first side marker lamp 118 to draw power provided by the first vehicle 100. For example, the first light source 402 can be operatively coupled to power or signal transmission wires and/or a circuit board of the first side marker lamp 118, which is disclosed in greater detail below in connection with FIG. 5. In other examples, the first light source 402 includes an internal power source to provide power thereto, such as a battery.

As disclosed above, in the example of FIG. 4, at least some of the light 408 emitted via the side marker lamp 118 is directed onto the tread 108 of the first example tire 102 to charge the wear bar(s) 202 that are exposed to light 408. Additionally or alternatively, in some examples, one or more light sources can be coupled to a surface of the wheel well 110 (e.g., a surface 410 of the wheel well 110 as illustrated in FIG. 4) such that the light source (e.g., a battery operated light source) is disposed in an interior of the wheel well 110. In such examples, the tire 102 is exposed to the light via light source(s) disposed in the wheel well 110 in addition to or as an alternative to light source(s) associated with the vehicle lamp(s).

Figure 5:
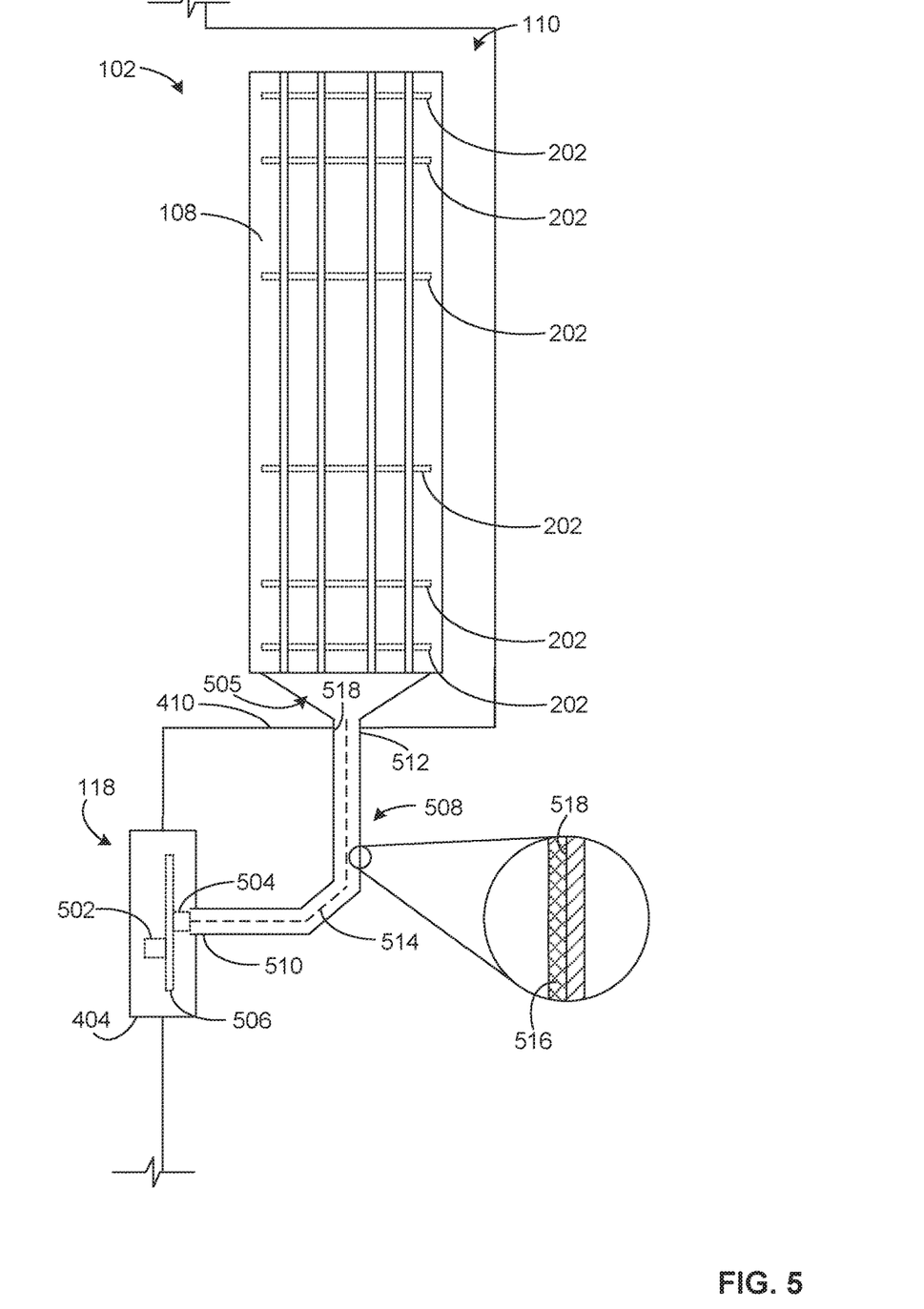
FIG. 5 is a top view of a wheel well of the example vehicle of FIG. 1 including a second example light source for detecting tire tread wear in accordance with the examples disclosed herein.

FIG. 5 is a top view of the wheel well 110 of the first vehicle 100 of FIG. 1 including the first example tire 102 and a second example light source 504 for detecting tire tread wear in accordance with the examples disclosed herein. In the illustrated example, the second light source 504 is operatively coupled to the first side marker lamp 118 of the first vehicle 100 disposed proximate to the first or front tire 102. The first side marker lamp 118 includes the lamp light 502 to emit a visible light through the lens 404 and away from the first vehicle 100. The lamp light 502 of the illustrated example can be one of an LED, a light bulb, etc.

The first tire 102 of the illustrated example includes a plurality of wear bars 202 coupled to (e.g., formed in) the tread 108 of the tire 102. According to the illustrated example, the second light source 504 is disposed within the first side marker lamp 118 and generates a light (e.g., a non-visible light and/or a visible light) 505. The second light source 504 can be any one or more of an LED (e.g., a UV LED), a light bulb (e.g., a UV light bulb), etc. In the example of FIG. 5, at least a portion of one or more of the wear bar(s) 202 is exposed to the light 505 during rotation of the first tire 102 (i.e., when the wear bar(s) 202 are exposed due to tread wear) or while the first tire 102 is stationary (e.g., via a battery of the vehicle 100).

In some examples, the second light source 504 draws power provided by the first vehicle 100 to generate and emit the light 505. For example, the first side marker lamp 118 includes a circuit board 506 disposed therein. The lamp light 502 is operatively coupled to the circuit board 506, which controls the lamp light 502, for example, via a command signal (e.g., provided by a driver of the first vehicle 100) and electrical power provided by the first vehicle 100. In such examples, the second light source 504 is operatively coupled to the circuit board 506 to receive the electrical power of first vehicle 100, thereby generating the light 505 and emitting the light 505 therefrom. In other examples, the second light source 504 can draw power from any other suitable power source such as, for example, a battery operatively coupled to the second light source 504 and/or disposed within the first side marker lamp 118.

While FIG. 5 depicts the example second light source 504 relative to the first side marker lamp 118 of the first vehicle 100, the example second light source 504 of FIG. 5 could be implemented in connection with one or more of the other lamps of the first vehicle 100 (and/or other types of vehicles). For example, one or more of the headlamps 112, the fog lamps 114, the taillamps 116 and/or any other vehicle lamps may include the above-disclosed lens 404, the lamp light 502, the second light source 504, and/or the circuit board 506 of FIG. 5.

The example of FIG. 5 includes means for directing the light 505 from the second light source 504 to the first tire 102. For example, the means for directing the light 505 can be a conduit or duct (e.g., a pipe, a tube, etc.) 508 having a first end 510 disposed proximate to the second light source 504 such that light 505 shines into the first end 510. Put another way, the duct 508 receives and/or collects the light 505 provided by the second light source 504. The example duct 508 has a second end 512 to emit and/or focus the light 505 onto at least a portion of the first tire 102 including the wear bar(s) 202. In some examples, the second end 512 of the duct is coupled to and/or positioned adjacent the surface 410 of the wheel well 110 (e.g., a surface of the wheel well 110 proximate to the side marker lamp 118) to direct the light 505 onto the first tire 102.

In some examples, the first end 510 of the duct 508 surrounds or substantially surrounds the second light source 504 and/or is coupled to the second light source 504. In other examples, the first end 510 is disposed proximate to the second light source 504 such that the first end 510 is spaced by a distance (e.g., 0.1 inches, 0.5 inches, 1 inch, etc.) relative to the second light source 504. In some such examples, the first end 510 is spaced a distance from the second light source 504 that still enables a substantial amount of light to be directed into the duct 508.

According to the illustrated example, the duct 508 defines a path (represented by the dotted/dashed line in FIG. 5) 514 between the first end 510 and the second end 512 to cause the light 505 travelling therethrough to be directed along the path 514. In this example, the path 514 of the duct 508 is curved to enable the light to effectively travel around components within the first vehicle 100 that would have otherwise prevented the light 505 from traveling to the first tire 102 and/or the wear bar(s) 202. In other examples, the path 514 of the duct 508 is substantially linear or substantially straight. In some examples, the duct 508 is flexible such that the path 514 of the duct 508 can be easily manipulated (e.g., by the vehicle manufacturer, by the driver of the first vehicle 100, by a vehicle servicer, etc.) to ensure the wear bar(s) 202 and/or the portion of the first tire 102 receives the light 505 provided by the second light source 504.

The example of FIG. 5 can include other means for directing the light 505 in addition to or as an alternative to the example duct 508. The means for directing the light 505 can include one or more structures that reflect and/or refract the light 505 to cause the light 505 to travel between the second light source 504 and the first tire 102 along a path (e.g., a non-linear path or a substantially linear path) substantially defined by the structure(s). For example, the means for directing the light 505 can include one or more fiber optic cables and/or mirrors.

In the example of FIG. 5, the duct 508 includes an optical material at least partially disposed thereon, which protects the duct 508 and/or enables the light 505 to better travel therethrough. For example, a silicon material 516 can be disposed uniformly or non-uniformly along one or more portions of an inner surface 518 of the duct 508. In such examples, the silicon material 516 enables the inner surface 518 to repel water, dirt and/or other elements of the environment, which can extend a life of the duct 508 and/or prevent damage(s) caused by the elements of the environment. Moreover, the silicon material 516 can effectively transmit, for example, UV light through the duct 508 and does not degrade when exposed to the UV light. Additionally or alternatively, in other examples, the optical material can include one or more of silver, aluminum, etc. to protect the inner surface 518 of the duct 508 and/or enable the light 505 to better travel therethrough. In some examples, the duct 508 is composed of one or more of types of optical materials.

In some examples, the first end 510 and/or the second end 512 of the duct 508 have a particular geometry, which can facilitate the collection of the light 505 by the first end 510 and/or enable the second end 512 to focus the light 505 onto at least a portion of the first tire 102 including the wear bar(s) 202. For example, the first end 510 and/or the second end 512 have a conical geometry, parabolic geometry, etc. formed and/or molded thereon.

Figure 6:
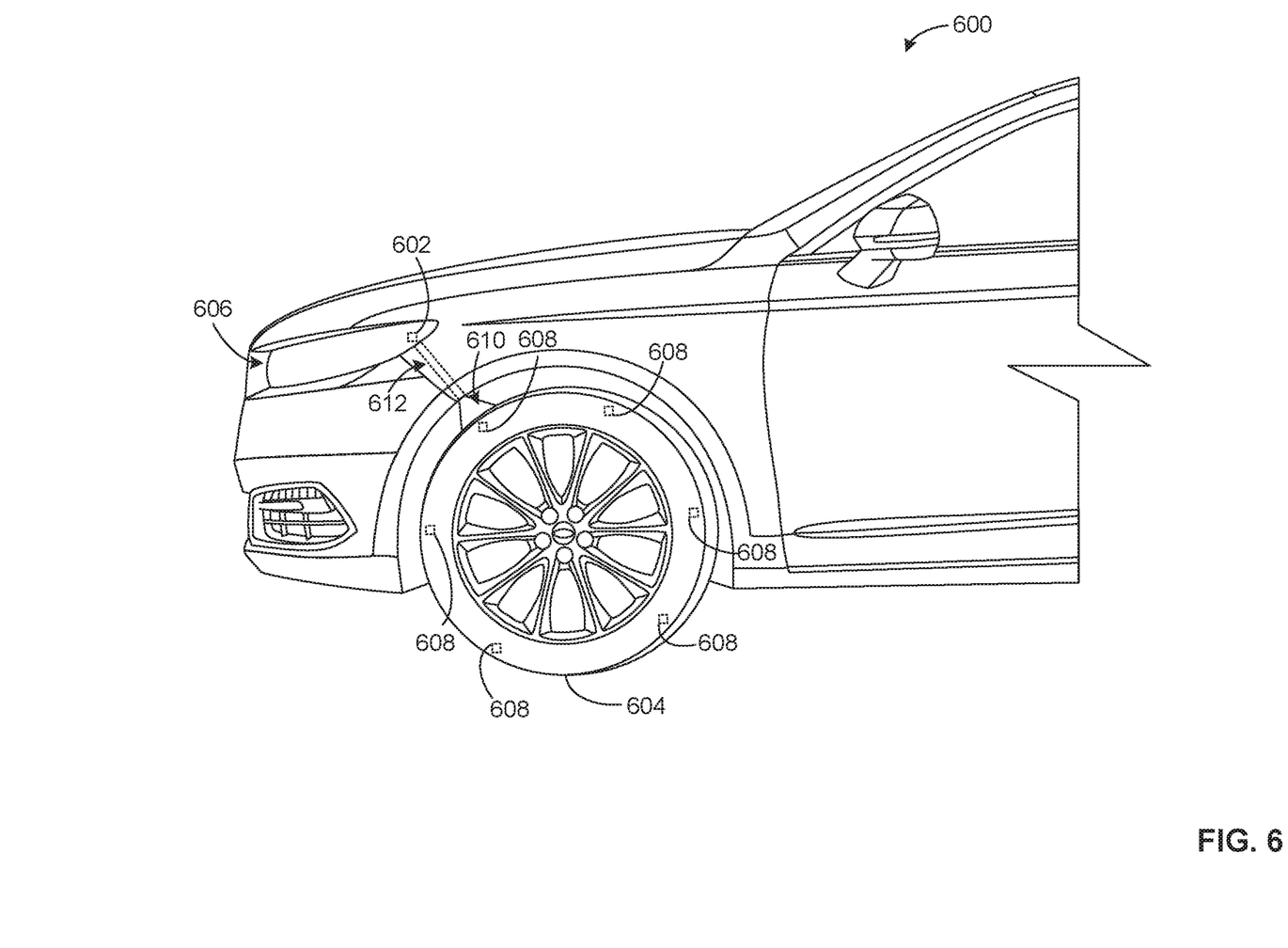
FIG. 6 is a partial side view of a second example vehicle including a third example light source for detecting tire tread wear in accordance with the examples disclosed herein.

FIG. 6 is a partial side view of a second example vehicle 600 including an example third light source 602 for detecting tire tread wear in accordance with examples disclosed herein. The second vehicle 600 of the illustrated example includes a tire 604 and a headlamp 606 having the third light source 602 disposed therein. The tire 604 of the illustrated example includes a plurality of wear bars 608 coupled thereto (e.g., disposed in a tread of the tire 604). One or more of the wear bars 608 of the illustrated example includes means for glowing (e.g., a long persistence phosphor) disposed therein to enable at least a portion of the wear bar(s) 608 to glow when exposed to a light (e.g., a non-visible light and/or a visible light) 610 provided by the third light source 602 of FIG. 6.

According to the illustrated example, the third light source 602 can be any one or more of an LED (e.g., a UV LED), a light bulb (e.g., a UV light bulb), etc. to generate the light 610 and emit the light 610 onto the wear bar(s) 608 of the tire 604. In some examples, the third light source 602 is operatively coupled to a circuit board of the headlamp 606 to received power therefrom. In some examples, the means for glowing causes the wear bar(s) 608 and/or the portion of the tire 604 to glow for a period of time (e.g., up to about 48 hours) after being exposed to the light 610 for a certain amount of time.

According to the illustrated example, the second vehicle 600 includes means for directing the light 610 coupled thereto. For example, a duct 612 is interposed between the third light source 602 and the tire 604. The duct 612 of the illustrated example receives the light 610 provided from the third light source 602 and directs the light 610 to the tire 604 along a path (e.g., a non-linear path or a substantially linear path) provided by the duct 612.

Figure 7:
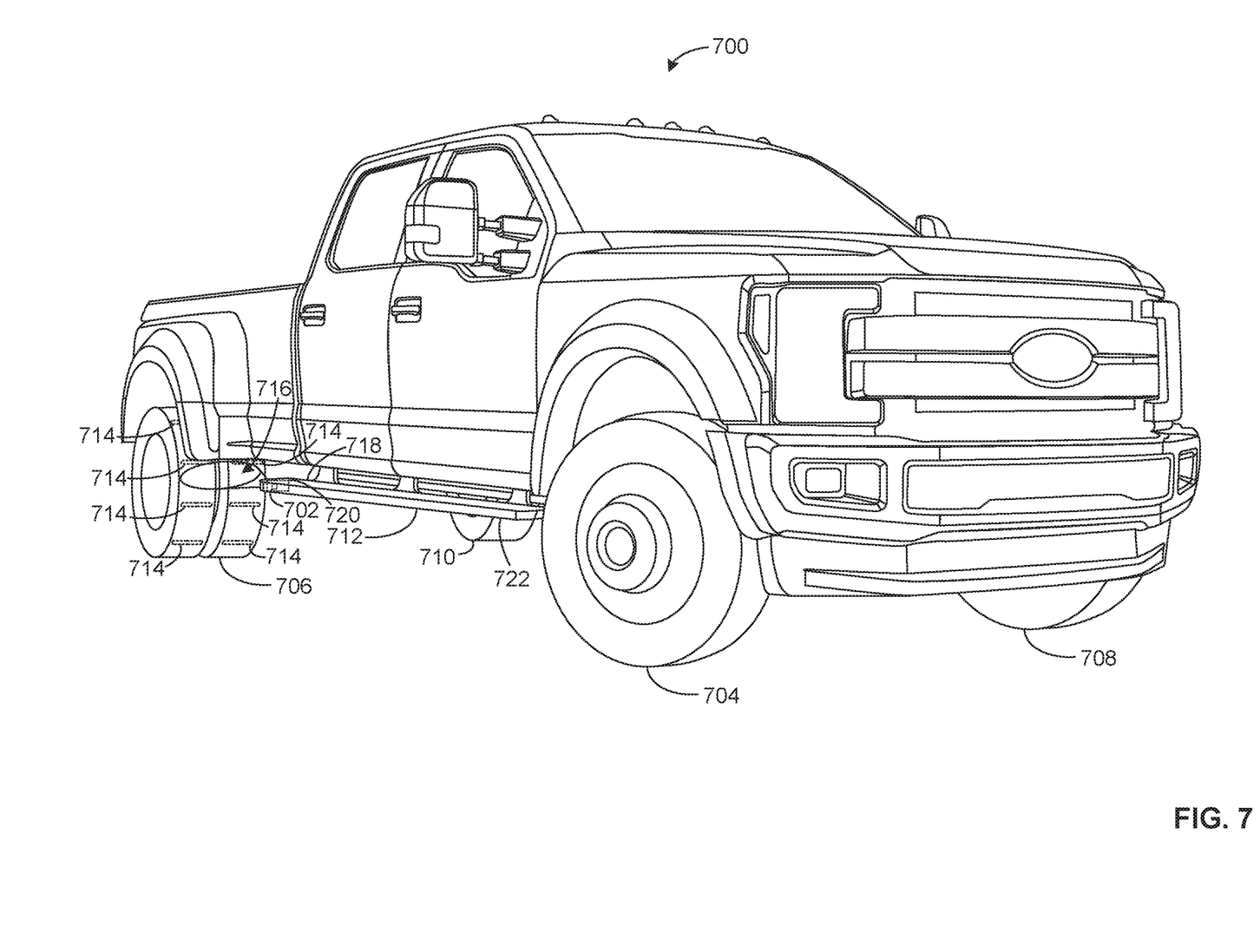
FIG. 7 is a left, front perspective view of a third example vehicle including a fourth example light source for detecting tire tread wear in accordance with the examples disclosed herein.

FIG. 7 is a left, front perspective view of a third example vehicle 700 including a fourth example light source 702 for detecting tire tread wear in accordance with examples disclosed herein. According to the illustrated example, the vehicle 700 also includes a first (e.g., front) tire 704, a second (e.g., rear) tire 706, a third (e.g., front) tire 708, a fourth (e.g., rear) tire 710, and a running board 712. In this example, the second tire 706 includes a plurality of wear bars 714 coupled thereto (e.g., disposed in a tread of the second tire 706). One or more of the wear bars 714 of the illustrated example includes means for glowing disposed therein (e.g., a luminescent material) to enable at least a portion of the wear bar(s) to glow when exposed to a light (e.g., a non-visible light and/or a visible light) 716 provided by the fourth light source 702. Although the example of FIG. 7 is discussed in connection with the second tire 706, the example of FIG. 7 can be implemented with any of the other tires 704, 708, 710 of the third vehicle 700 of FIG. 7.

According to the illustrated example, the fourth light source 702 can be any one of an LED (e.g., a UV LED), a light bulb (e.g., a UV light bulb), etc. to generate the light 716 and emit the light 716 onto at least a portion of the tread of the second tire 704 and, in particular, at least a portion of exposed wear bar(s) 714 of the second tire 704. In some examples, the means for glowing enables the wear bar(s) 714 to glow for a period of time (e.g., up to about 48 hours) after being exposed to the light 716 for a certain amount of time.

In this example, the fourth light source 702 is coupled to the running board 712 of the third vehicle 700. For example, the fourth light source 702 can be disposed proximate to a first end 718 of the running board 712, or an end proximate to the second tire 706. In some examples, the fourth light source 702 is coupled to a lamp 720 of the running board 712 (i.e., a running board lamp). For example, the fourth light source 702 can be operatively coupled to a circuit board of the running board lamp to receive power therefrom to generate the light 716. In other examples, the fourth light source 702 includes a battery to provide power.

In some examples, the fourth light source 702 is coupled to the running board 712 such that the light 716 emitted by the fourth light source 702 is substantially directed onto at least a portion of the second tire 704 (e.g., without interference or substantial interference from other vehicle components relative a path of the light 716). In some other examples, means for directing the light 716 (e.g., a duct) is coupled to the running board 712 (e.g., an interior of the running board 712) to deliver the light to the second tire 706. In some examples, the fourth light source 702 is disposed proximate to a second end 722 of the running board 712 opposite the first end 718 and the means for directing the light 716 extends along a portion of the running board 712 to deliver the light 716 to the second tire 706 via the first end 718 of the running board 712.

Thus, FIGS. 4-7 illustrate different examples for exposing tire wear bar(s) to light and charging the means for glowing of the example wear bar(s) (e.g., the phosphor material disposed in the wear bar(s)). In some examples, the light source includes a discrete light source disposed proximate to the wheel well (e.g., a battery operated light). In other examples, the light source harnesses the power provided by existing vehicle lamps (e.g., side mark lamps, head lights, running board lamps) to generate light that can be delivered to the tire(s) of the vehicle. In some examples, means for directing the light, such as a duct, enable the light source to be coupled to a lamp that is spaced apart from the tire (e.g., the headlights) while delivering the light to the tire without interfering with other vehicle components.

Figure 8:
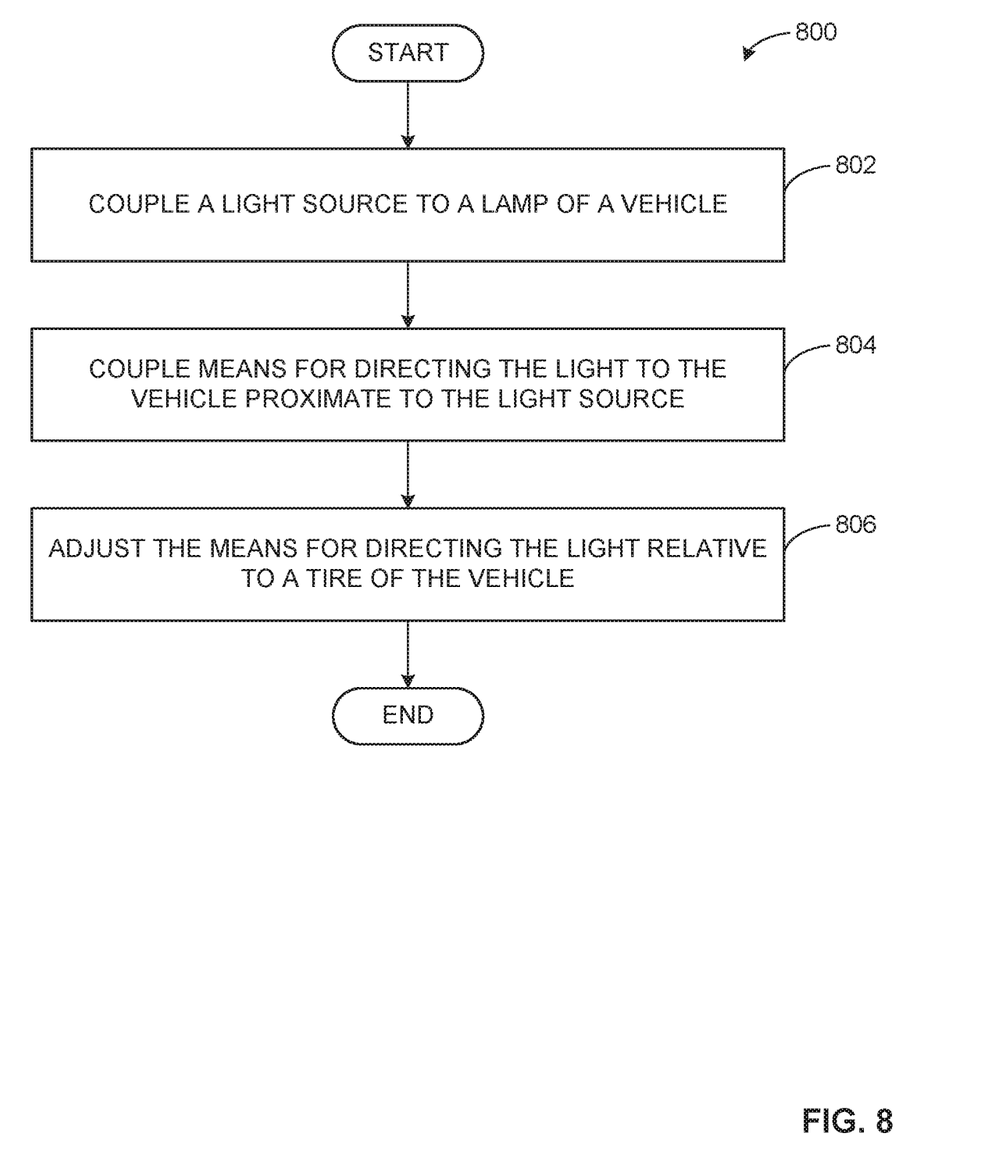
FIG. 8 is a flow diagram of an example method that can be used to implement examples disclosed herein.

FIG. 8 is a flow diagram of an example method 800 that can be used to implement one or more of the example first light source 402, the example second light source 504, the example third light source 602 and/or the example fourth light source 702 of FIGS. 4-7 to deliver light to tire(s) including tire wear bar(s). The example method 800 can be implemented, for example, in any one or more of the first vehicle 100, the second vehicle 600 and/or the third vehicle 700 of FIGS. 1, and 4-7. The example method 800 includes coupling a light source to a lamp of a vehicle (block 802). For example, as illustrated in FIG. 4, the first light source 402 can be coupled to one or more of the first side marker lamps 118 and/or the second side marker lamp 119 of the first vehicle 100 proximate to one or more of the tires 102, 104 of the first vehicle 100. In some such examples, the first light source 402 and/or the side marker lamp(s) 118, 119 is/are positioned and/or oriented such that the light 408 provided by the first light source 402 is emitted onto at least a portion of the tire(s) 102, 104.

In some examples, as shown in FIG. 5, the second light source 504 is coupled to the first side marker lamp 118 of the first vehicle 100 and operatively coupled to the circuit board 506 of the first side marker lamp 118 to receive power via the first vehicle 100. Similarly, in other examples, the third light source 602 is coupled to the headlamp 606 of the second vehicle 600 (e.g., as shown in FIG. 6).

In some examples, the fourth light source 702 is coupled to the running board 712 of the third vehicle 700 proximate to one or more of the tires 704, 706, 708, 710 of the third vehicle 700 as illustrated in FIG. 7. In such examples, the fourth light source 702 may be operatively coupled to the lamp 720 of the running board 712. The example method 800 of FIG. 8 can include coupling the light source to one or more of vehicle lamps of FIGS. 1 and 4-7 and/or other vehicle lamps of a vehicle (e.g., the vehicle 100, 600, 700 of FIGS. 1, 6 and/or 7).

The method 800 also includes coupling means for directing the light to the vehicle proximate to the light source (block 804). For example, as shown in FIG. 5, the duct 508 is coupled to the first vehicle 100 interposed between the second light source 504 and the first tire 102 of the first vehicle 100. In such examples, the first end 510 of the duct 508 is disposed proximate to and/or coupled to the second light source 504 to receive the light 505 provided therefrom. The example duct 508 of FIG. 5 can be coupled to any one of the light sources 402, 504, 602, 702 of the vehicles 100, 600, 700 of FIGS. 1 and 4-7.

Additionally or alternatively, in some examples, the means for directing the light can include one or more other structures for directing the light. For example, the means for directing light emitted by the light sources 402, 504, 602, 702 can include one or more fiber optic cables and/or mirrors that are installed in the vehicle 100, 600, 700 to direct light from the light source(s) 402, 504, 602, 702.

The method 800 includes adjusting the means for directing the light relative to a tire of the vehicle (block 806). In some examples, the second end 512 of the duct 508 is positioned proximate to one or more of the tires 102, 104, 604, 704, 706, 708, 710 of the respective vehicle(s) 100, 600, 700 to emit the light onto the one or more of the tires 102, 104, 604, 704, 706, 708, 710 (e.g., onto the tread 108 of the tire(s) 102, 104, 604, 704, 706, 708, 710). For example, the second end 512 of the duct 508 can be coupled to and/or positioned adjacent a surface of the wheel well 110 (e.g., the surface 410 shown in FIGS. 4 and 5) to direct the light onto the tire disposed in the wheel well (e.g., the first tire 102 of FIG. 1). The duct 508 causes the light traveling therethrough to follow the path 514 provided and/or defined by the duct 508.

In some examples, adjusting the means for directing the light includes adjusting or manipulating the path 514 provided by the duct 508 to reduce interference between the light and one or more components of the vehicle 100, 600, 700 (e.g., vehicle component(s) disposed between the headlamp(s) 112 and the wheel well 110). In such examples, the duct 508 is manipulated to provide a substantially linear path or a non-linear path to enable the light to travel around components within the vehicle 100, 600, 700 that would have otherwise prevented the light from traveling to the respective tire(s) 102, 104, 604, 704, 706, 708, 710 of the vehicle 100, 600, 700. For example, the one or more portions of the duct 508 can be bent, flexed, etc. (e.g., via a driver, a vehicle servicer, a manufacture, etc.) to manipulate or adjust the duct 508 relative to the components of the vehicle 100, 600, 700 that would interfere (e.g., block, partially block) the light emitted from the second end 512 of the duct 508. Thus, the example method 800 provides for positioning of the means for directing the light (e.g., the duct 508) to effectively direct the light 505 to the one or more tires 102, 104.

Although the first light source 402, the second light source 504, the third light source 602 and/or the fourth light source 702 are described with reference to the flowchart illustrated in FIG. 8, any other method of implementing the first light source 402, the second light source 504, the third light source 602 and/or the fourth light source 702 may alternatively be used. For example, the order of execution of the blocks of FIG. 8 may be combined and/or some of the blocks described may be changed, eliminated, or additional blocks may be added. The example method 800 shown in FIG. 8 is only one example method describing the implementation of the first light source 402, the second light source 504, the third light source 602 and/or the fourth light source 702.

Figure 9:
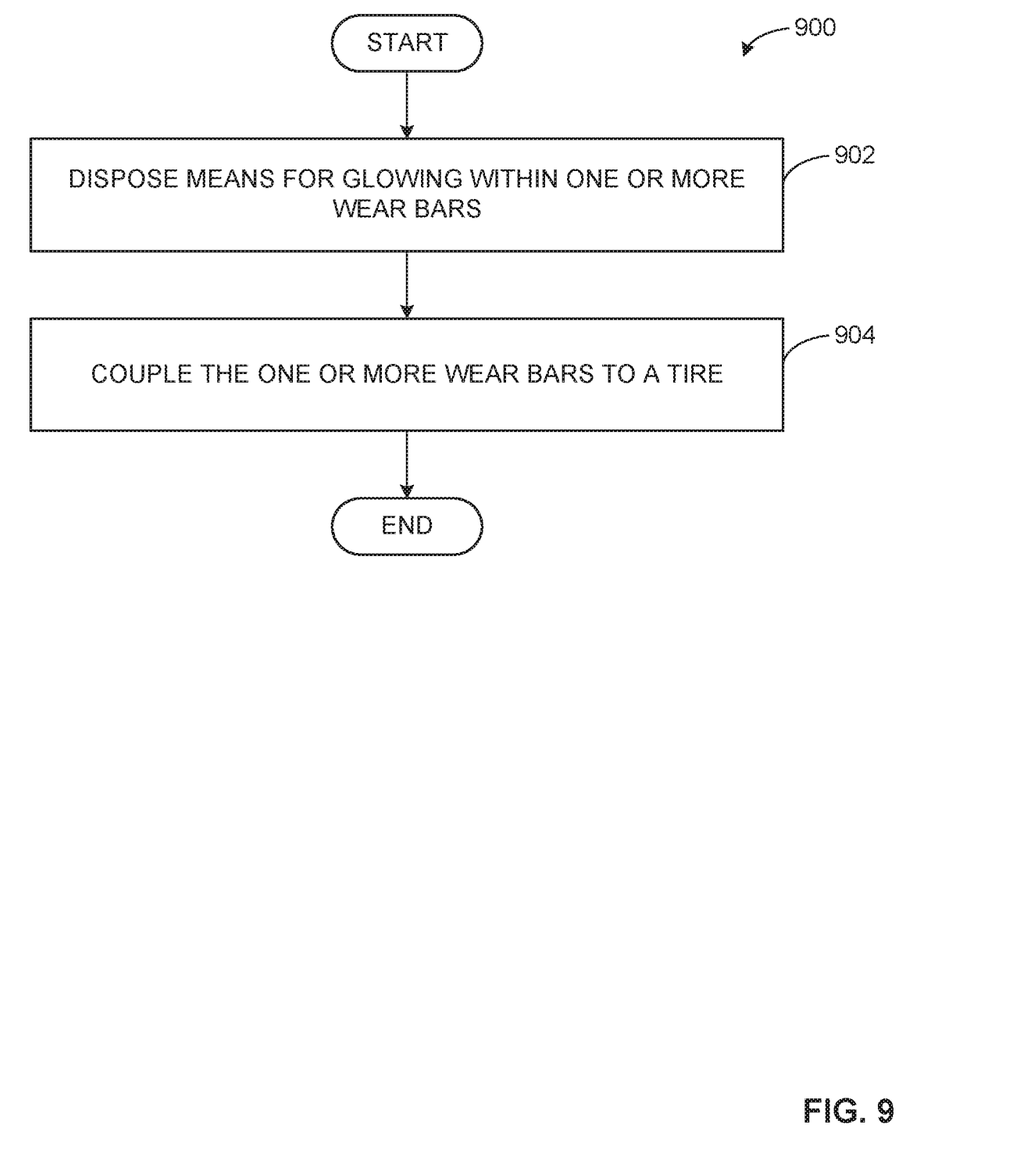
FIG. 9 is a flow diagram of another example method that can be used to implement examples disclosed herein.

FIG. 9 is a flow diagram of an example method 900 that can be used to provide a tire including one or more tire tread wear bars (e.g., the wear bar(s) 202, 608, 714 of FIGS. 2-7). The example method 900 can be implemented, for example, with respect to any one or more of the tires 102, 104, 604, 704, 706, 708, 710 of the example vehicles 100, 600, 700 of FIGS. 1 and 4-7. The method 900 begins by disposing means for glowing in one or more wear bars (block 902). For example, at least a portion of a wear bar 202, 608, 714 is formed and/or molded with a phosphor material (e.g., a long persistence phosphor), which enables at least a portion of the wear bar 202, 608, 714 to glow when exposed to a light and/or after being exposed to the light.

The method 900 includes coupling the one or more wear bars to a tire (block 904). For example, as illustrated in FIG. 2, the wear bar 202 is disposed within the tread 108 of the tire 102 of the first vehicle 100 at the depth 212 beneath the outer surface 208 of the first tire 102. In some examples, the tire(s) 102, 104, 604, 704, 706, 708, 710 include two or more wear bars 202 coupled thereto and distributed radially relative to a rotational axis of the tire(s) (e.g., the axis 206 of FIG. 2). In some examples, the wear bar(s) 202 extend through the tread 108 of the tire(s) 102, 104, 604, 704, 706, 708, 710 and do not extend through any of the grooves 204 of the tire(s) or do not extend through all of the grooves 204 of the tire(s).

In some examples, the tire(s) 102, 104, 604, 704, 706, 708, 710 of the example vehicle(s) 100, 600, 700 are molded and/or formed with the wear bar(s) 202, 608, 714 during manufacturing of the tire(s) 102, 104, 604, 704, 706, 708, 710. For example, the wear bar(s) 202, 608, 714 can be disposed on one or more layers of tread 108. The layer(s) of the tread 108 are wound to form the shape of the tire(s) 102, 104, 604, 704, 706, 708, 710. One or more layers of the tread 108 can be laid over the wear bar(s) 202 to cover the wear bar(s) 202, 608, 714 (e.g. until the tread wears during use of the tire and the wear bar(s) are exposed).

Although the wear bar(s) 202 are described with reference to the flowchart illustrated in FIG. 9, any other method of implementing the wear bar(s) 202 may alternatively be used. For example, the order of execution of the blocks of FIG. 9 may be combined and/or some of the blocks described may be changed, eliminated, or additional blocks may be added. The example method 900 shown in FIG. 9 is only one example method describing the implementation of the wear bar 202.

As used herein, the terms "including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

From the foregoing, it will be appreciated that tire wear detection apparatus and related methods have been disclosed that enable at least a portion of a wear bar of a tire of a vehicle to glow when a tread of the tire wears and/or degrades and at least a portion of the wear bar is exposed. As such, a person observing the vehicle can readily identify the glowing wear bar and, as a result, determine whether the tire of the vehicle needs to be replaced or otherwise maintained. Thus, disclosed examples aid a driver and/or an owner of the vehicle in properly maintaining the vehicle, thereby reducing and/or eliminating risk(s) for the vehicle occupant(s) that stem from traveling in a vehicle with worn tire tread. Further, disclosed examples provide for efficient charging of the tire wear bar via light source(s) that are coupled to the vehicle and, thus, do not rely on external light sources to charge the tire wear bar(s). Thus, examples disclosed herein provide for reliable warnings of tire tread wear.

Although certain example apparatus and methods and articles of manufacture have been disclosed herein, the scope of coverage of this patent is not limited thereto. On the contrary, this patent covers all apparatus and methods and articles of manufacture fairly falling within the scope of the claims of this patent.

What is claimed is:

1. A vehicle comprising:
a tire including a wear bar coupled thereto, the tire being located in a wheel well of the vehicle;
a lamp including a first light source and a second light source, the first light source to emit light in a direction away from an exterior of the vehicle; and
a duct to channel light from the second light source to be emitted within the wheel well and toward a tread of the tire, at least a portion of the wear bar to glow when exposed to the channeled light.

2. The vehicle of claim 1, wherein the wear bar includes a phosphor material disposed therein to enable the portion of the wear bar to glow for a time interval after being exposed to the channeled light.

3. The vehicle of claim 1, wherein the duct has a first end disposed proximate to the second light source and a second end disposed proximate to the tire.

4. The vehicle of claim 3, wherein the duct extends along a curved path to direct the channeled light along the path between the first end and the second end.

5. The vehicle of claim 1, wherein the duct has a silicon material disposed thereon.

6. The vehicle of claim 1, wherein the wear bar includes a tapered cross-section such that an outer surface area of the wear bar increases as the tire wears.

7. The vehicle of claim 1, wherein the second light source is an ultraviolet light-emitting diode.

8. The vehicle of claim 1, wherein the lamp is at least one of a head lamp, a fog lamp, a tail lamp, or a side marker lamp.

9. The vehicle of claim 8, wherein the lamp includes a circuit board operatively coupled to the second light source to provide power to the second light source.

* * * * *